United States Patent
Costa et al.

(10) Patent No.: US 7,110,412 B2
(45) Date of Patent: Sep. 19, 2006

(54) METHOD AND SYSTEM TO TRANSPORT HIGH-QUALITY VIDEO SIGNALS

(75) Inventors: Pierre Costa, Austin, TX (US); John Robert Erickson, Austin, TX (US); Ahmad Ansari, Austin, TX (US)

(73) Assignee: SBC Technology Resources, Inc., Austin, TX (US)

( * ) Notice: Subject to any disclaimer, the term of this patent is extended or adjusted under 35 U.S.C. 154(b) by 1105 days.

(21) Appl. No.: 09/956,475

(22) Filed: Sep. 18, 2001

(65) Prior Publication Data
US 2003/0056223 A1    Mar. 20, 2003

(51) Int. Cl.
*H04L 12/56* (2006.01)
*H04L 12/28* (2006.01)
*H04J 3/16* (2006.01)

(52) U.S. Cl. .................. 370/395.61; 370/467
(58) Field of Classification Search ............. 370/395.6, 370/395.61, 466–467
See application file for complete search history.

(56) References Cited

U.S. PATENT DOCUMENTS

| | | | |
|---|---|---|---|
| 5,541,556 A | 7/1996 | Francis | |
| 5,754,254 A | 5/1998 | Kobayashi et al. | |
| 5,896,181 A | 4/1999 | Takamori | |
| 5,929,921 A | 7/1999 | Taniguchi et al. | |
| 6,026,434 A | 2/2000 | Kubota et al. | |
| 6,028,934 A | 2/2000 | Shimosaka | |
| 6,055,247 A | 4/2000 | Kubota et al. | |
| 6,078,958 A | 6/2000 | Echeita et al. | |
| 6,137,944 A | 10/2000 | Murakami | |
| 6,157,674 A | 12/2000 | Oda et al. | |
| 6,163,284 A * | 12/2000 | Munakata | 341/68 |
| 6,226,443 B1 | 5/2001 | Morioka et al. | |
| 6,414,960 B1 * | 7/2002 | Kuhn et al. | 370/395.64 |
| 6,785,289 B1 * | 8/2004 | Ward et al. | 370/412 |
| 2004/0246977 A1 * | 12/2004 | Dove et al. | 370/395.61 |

* cited by examiner

*Primary Examiner*—Chi Pham
*Assistant Examiner*—Ronald Abelson
(74) *Attorney, Agent, or Firm*—Brinks Hofer Gilson & Lione (57) ABSTRACT

Society of Motion Picture and Television Engineers (SMPTE) video data is separated into first data and second data. A first signal is formed based on the first data. A second signal is formed based on the second data. The first signal is transported via a first Optical Carrier 3 (OC-3) channel. The second signal is transported via a second OC-3 channel.

35 Claims, 7 Drawing Sheets

METHOD AND SYSTEM TO TRANSPORT HIGH-QUALITY VIDEO SIGNALS

TECHNICAL FIELD

The present invention relates to methods and systems for transporting high-quality video signals.

BACKGROUND OF THE INVENTION

The video industry has adopted the Society of Motion Picture and Television Engineers (SMPTE) 259M (level C) standard almost exclusively for high quality video in studio and production applications. In some applications, a SMPTE 259M signal is to be transported to a remote location, which may be several miles away for example. Current methods of transporting SMPTE 259M signals or other professional quality video signals to remote locations use either dark fiber overlay networks or proprietary methods over very high bandwidth pipes. For example, an OC-12 channel may be used to transport an SMPTE 259M signal.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF PREFERRED EMBODIMENTS

Briefly, embodiments of the present invention provide an improved process for transporting high-quality video. The process includes separating the video data into two sets of data, encapsulating each set of data into asynchronous transfer mode (ATM) cells, and transporting two ATM cell-based bit streams over dual, concatenated Optical Carrier 3 (OC-3) channels. Error checking and/or correction is used to reduce the probability of data errors during transport.

Figure 1:
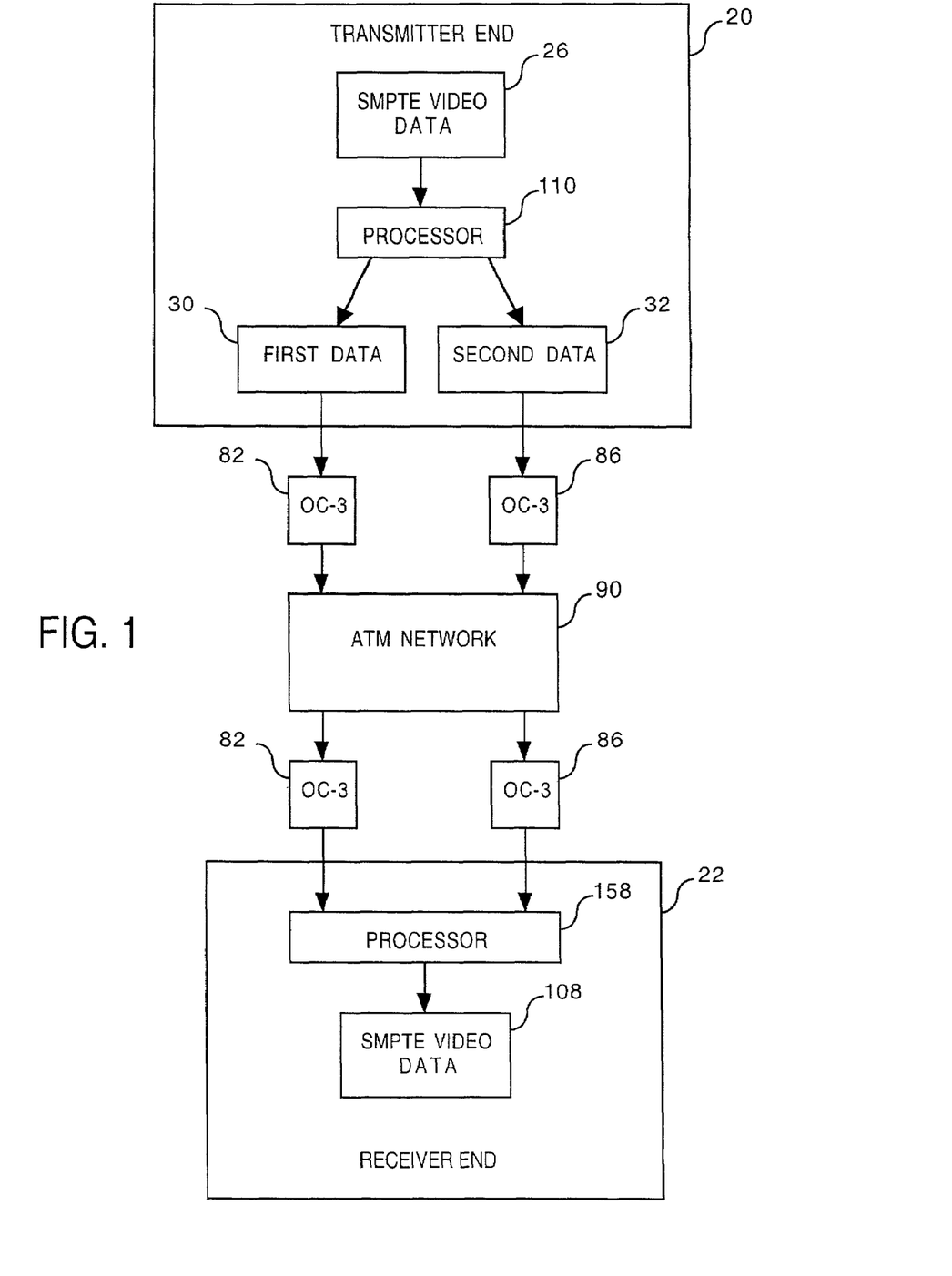
FIG. 1 is a block diagram of an embodiment of a system to transport high-quality video.

Embodiments of the present invention are described with reference to FIG. 1, which is a block diagram of an embodiment of a system to transport high-quality video, FIG. 2, which is a flow chart of an embodiment of a method performed at a transmitter end 20, and FIG. 3, which is a flow chart of an embodiment of a method performed at a receiver end 22.

As indicated by block 24, the method comprises separating SMPTE video data 26, such as SMPTE 259M video data, into first uncompressed data 30 and second uncompressed data 32. Preferably, the act of separating the SMPTE video data comprises separating each frame of the SMPTE video data into a first subframe and a second subframe. The first subframe comprises even lines of active video from the frame, and the second subframe comprises odd lines of active video from the frame. In addition to active video, the first subframe and the second subframe may further comprise horizontal ancillary data, optional video data and/or vertical ancillary data.

The SMPTE 259M standard is inherently suitable to separate video data because of its field and frame-oriented data structure. In addition, extraneous data can be eliminated since the timing signals are not necessary to carry along a transport stream.

Figure 4:
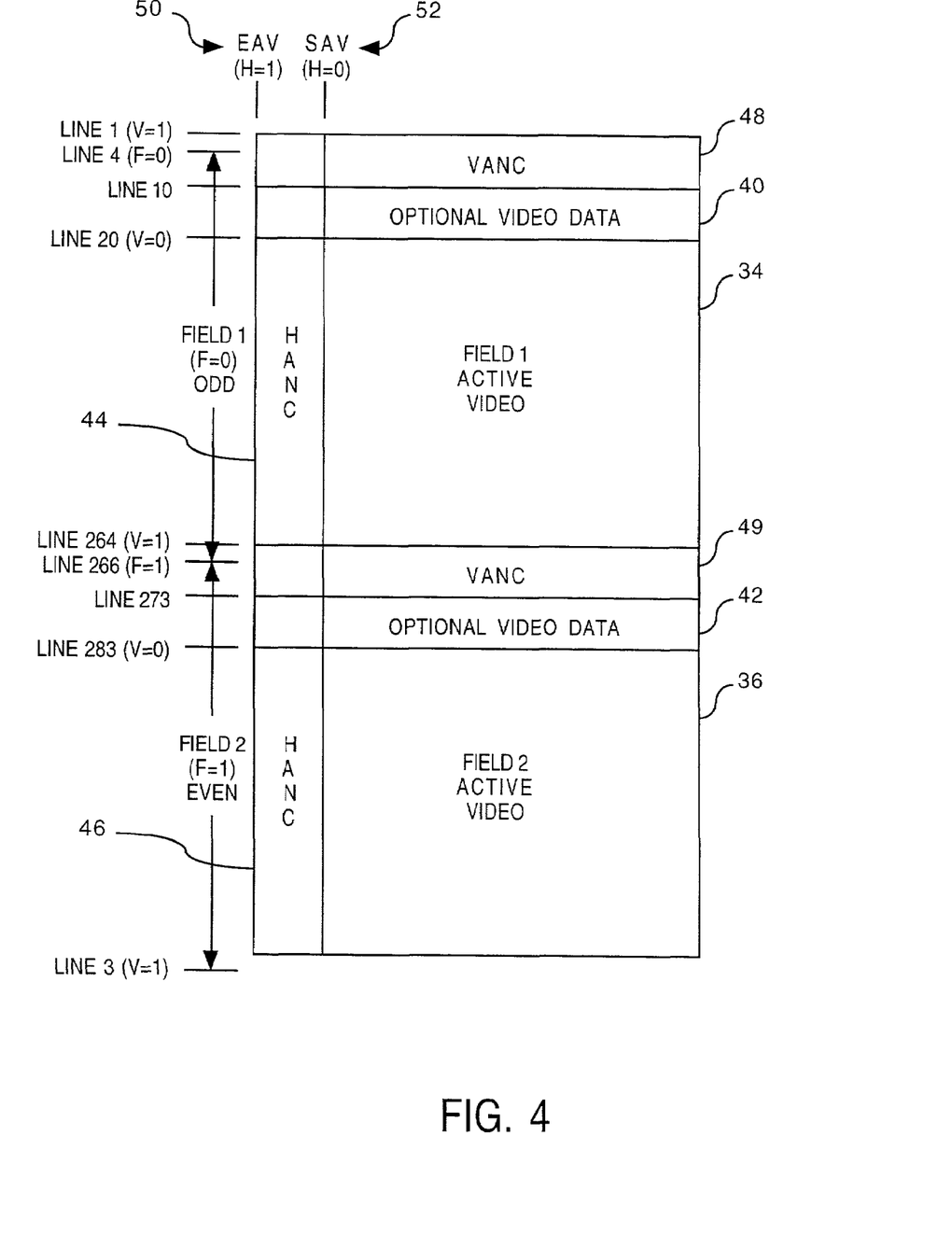
FIG. 4 illustrates the SMPTE 259M data structure.

FIG. 4 illustrates the SMPTE 259M data structure. The data structure comprises active video fields 34 and 36. The active video fields 34 and 36 contain component pixel data. The active video field 34 includes odd lines of active video from a frame, while the active video field 36 includes even lines of active video from a frame. Optional video fields 40 and 42 contain vertical blanking interval (VBI) data and non-critical data. Horizontal ancillary (HANC) data fields 44 and 46 contain audio, timing and control information. Vertical ancillary (VANC) data fields 48 and 49 contain special user information. A clear delineation between the fields is created by the inherent timing signals EAV 50 and SAV 52.

The aforementioned structure is exploited to separate the SMPTE video data into two equal blocks. The first uncompressed data includes data from the active video field 34, the HANC data field 44, and a portion of the data from the optional video field 40 and/or the VANC data field 48. The second uncompressed data includes data from the active video field 36, the HANC data field 46, and a portion of the data from the optional video field 42 and/or the VANC data field 49.

Referring back to FIG. 2, the method comprises acts of forming a first uncompressed signal based on the first uncompressed data (block 54) and forming a second uncompressed signal based on the second uncompressed data (block 56). The first uncompressed signal is based on the each first subframe. The second uncompressed signal is based on the each second subframe.

The act of forming the first uncompressed signal further comprises appending a corresponding first sequence number to each first subframe, and encapsulating each first subframe with its corresponding first sequence number into at least one asynchronous transfer mode (ATM) cell. Similarly, the act of forming the second uncompressed signal further comprises appending a corresponding second sequence number to each second subframe, and encapsulating each second subframe with its corresponding second sequence number into at least one ATM cell. The sequence numbers are appended to each subframe since traffic in most ATM networks can take any of several paths, each with a potentially different latency and cell delay variation. The sequence numbers are used at the receiving end 22 to order reconstructed frames.

In one embodiment, each sequence number is defined by 20 bits. One bit of the sequence number is used to identify whether the field is field 1 or field 2. Choosing 20 bits for the sequence number field allows sequence numbers up to 2^(20−1)=524,288. For a frame rate of 30 frames per second, the maximum video length for 20 sequence number bits is (524,288 frames)/((30 frames per second)*(3600 seconds per hour)), which approximately equals 4.854 hours.

Figure 2:
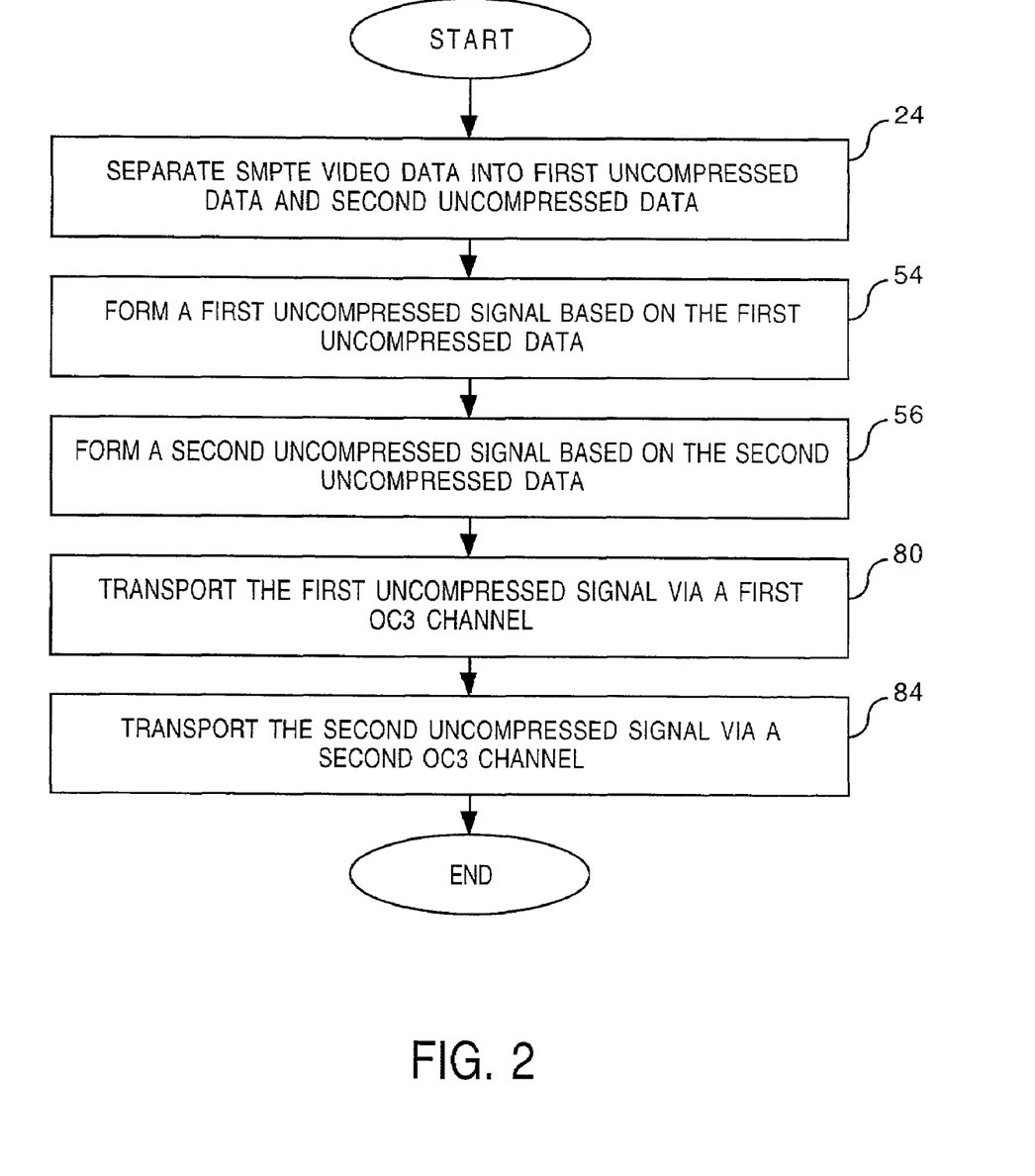
FIG. 2 is a flow chart of an embodiment of a method performed at a transmitter end.
Figures 5, 6:
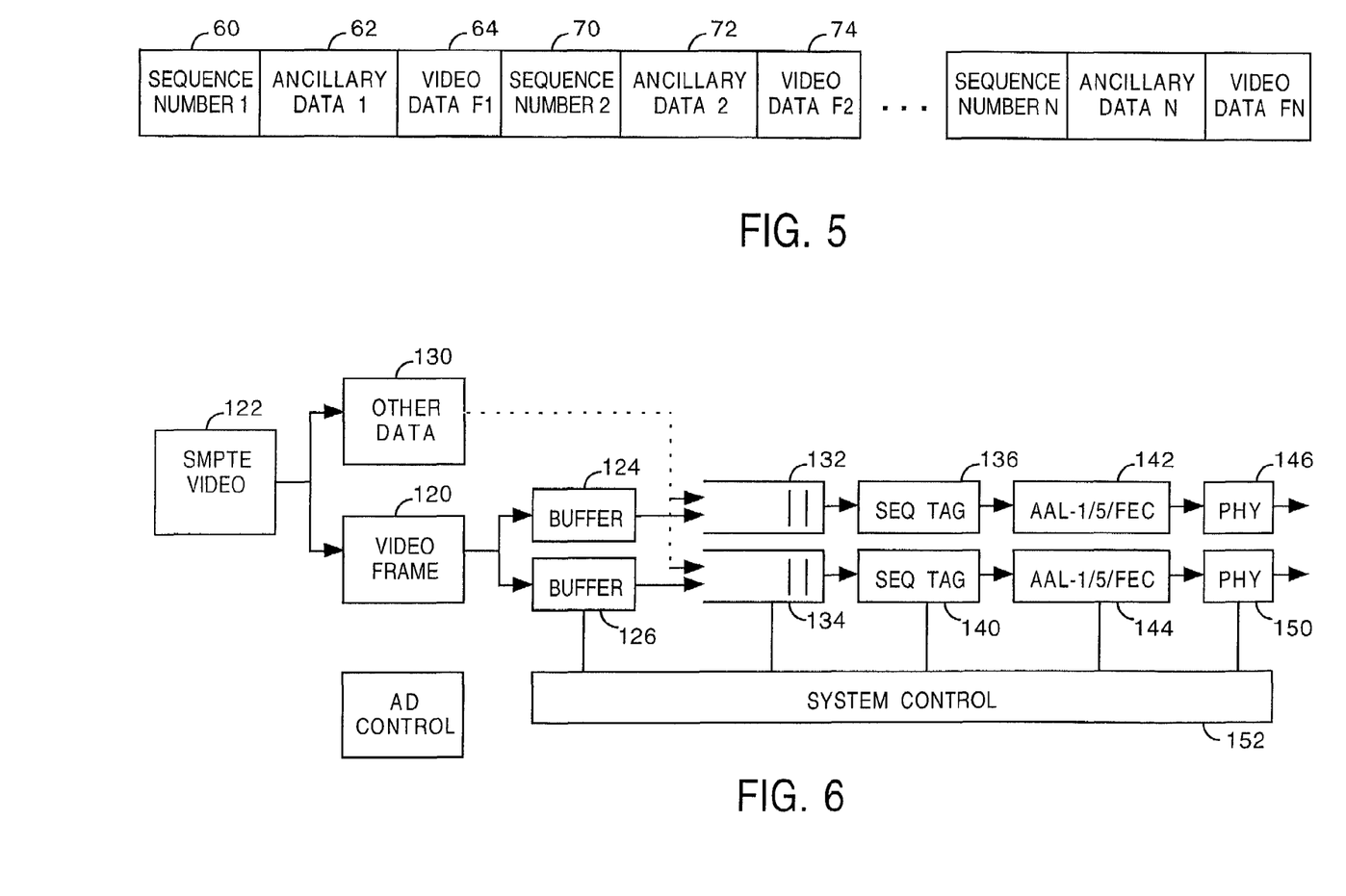
FIG. 5 is a block diagram illustrating an embodiment of an uncompressed signal based on a subframe of a SMPTE frame.
FIG. 6 is a schematic block diagram of an embodiment of a video processor at the transmitter end.

FIG. 5 is a block diagram illustrating an embodiment of an uncompressed signal which results from the act of either block 54 or block 56 in FIG. 2. The uncompressed signal comprises a bit stream including a sequence number 60, ancillary data 62, and active video data 64 for a subframe from a first frame. Thereafter, the bit stream includes a sequence number 70, ancillary data 72, and active video data 74 for a subframe from a second frame. The pattern of including a sequence number, ancillary data and active video data for a subframe is repeated for each succeeding frame.

The above-described encapsulation method distinguishes video data (e.g. field/frame data) from ancillary data to facilitate the SMPTE 259M video data being properly reconstructed at the receiver end 22. Since timing relationships are well-defined in the SMPTE 259M standard, and since a fixed frequency of 270 Mbps is used, logic at the receiver end 22 can add the proper timing signals.

The bandwidth required to transmit the above bit stream is calculated as follows. With respect to the active video bandwidth, each field has 244 active video lines. The number of words per line is 720 pixels*2(Cr, Y, Cb)=1440. Since each word consists of 10 bits, the number of bits per line is (1440 words per line)*(10 bits per word)=14,400. Thus, the total number of active video bits per field is (14,400 bits per line)*(244 active video lines per field)=3.5136 Mb. Since each frame is based on 2 fields, the total number of active video bits per frame is (3.5136 Mb per field)*(2 fields per frame)=7.0272 Mb. For a frame rate of 30 frames per second, the active video bit rate is (7.0272 Mb per frame)*(30 frames per second)=210.816 Mbps. Accounting for ATM overhead with a cell tax of 1.09433, the total active video bandwidth is 1.09433*210.816 Mbps=230.7043 Mbps.

The bandwidth for the HANC data is determined as follows. The HANC bit rate is 30 Mbps. Accounting for ATM overhead with a cell tax of 1.09433, the HANC bandwidth is 1.09433*30 Mbps=32.8302 Mbps.

The bandwidth for the VANC/optional data is determined as follows. Each frame has 20 lines allocated for VANC/optional data. The 20 lines comprise any 10 lines selected from lines 1–20, and any 10 lines selected from lines 264–283. Since the number of bits per line is 14,400, the total number of VANC/optional bits per frame is (14,400 bits per line)*(20 VANC/optional lines per field)=288,000. For a frame rate of 30 frames per second, the VANC/optional bit rate is (288,000 bits per frame)*(30 frames per second)=8.64 Mbps. Accounting for ATM overhead with a cell tax of 1.09433, the VANC/optional bandwidth is 1.09433*8.64 Mbps=9.4550112 Mbps.

The total data rate is equal to the sum of the total active video bandwidth, the HANC bandwidth and the VANC/optional bandwidth. Thus, the total data rate is 230.7043 Mbps+32.8302 Mbps+9.4550112 Mbps, which equals 272.984612 Mbps. This is less than the 299.52 Mbps bandwidth available on two OC-3 links. Since the data is separated into two fields, the total data rate per field is 272.984612 Mbps/2, which approximately equals 136.4923 Mbps.

Optionally, the act of forming the first uncompressed signal further comprises adding a first ATM adaptation layer (AAL) with either an error checking code or an error correcting code. Similarly, the act of forming the second uncompressed signal may optionally comprise adding a second ATM adaptation layer with either an error checking code or an error correcting code. A block coding algorithm such as Reed Solomon or another forward error correcting (FEC) code may be used.

Referring back to FIGS. 1 and 2, the method comprises transporting 80 the first uncompressed signal via a first OC-3 channel 82, and transporting 84 the second uncompressed signal via a second OC-3 channel 86. The OC-3 channels 82 and 86 are provided by an ATM network 90.

The adaptation layers may be added because of additional bandwidth available on two OC-3 links beyond the 272.984612 Mbps required by the two bit streams. Either AAL-1 with FEC or AAL-5 with FEC may be used. The former is less efficient but more robust, and the latter is more efficient and slightly less robust. The selection of which of these two adaptations to use may be dictated by specifications of a specific application. Note that the FEC process is symmetrical, requiring processing the inverse algorithm at the receiver end 22.

Figure 3:
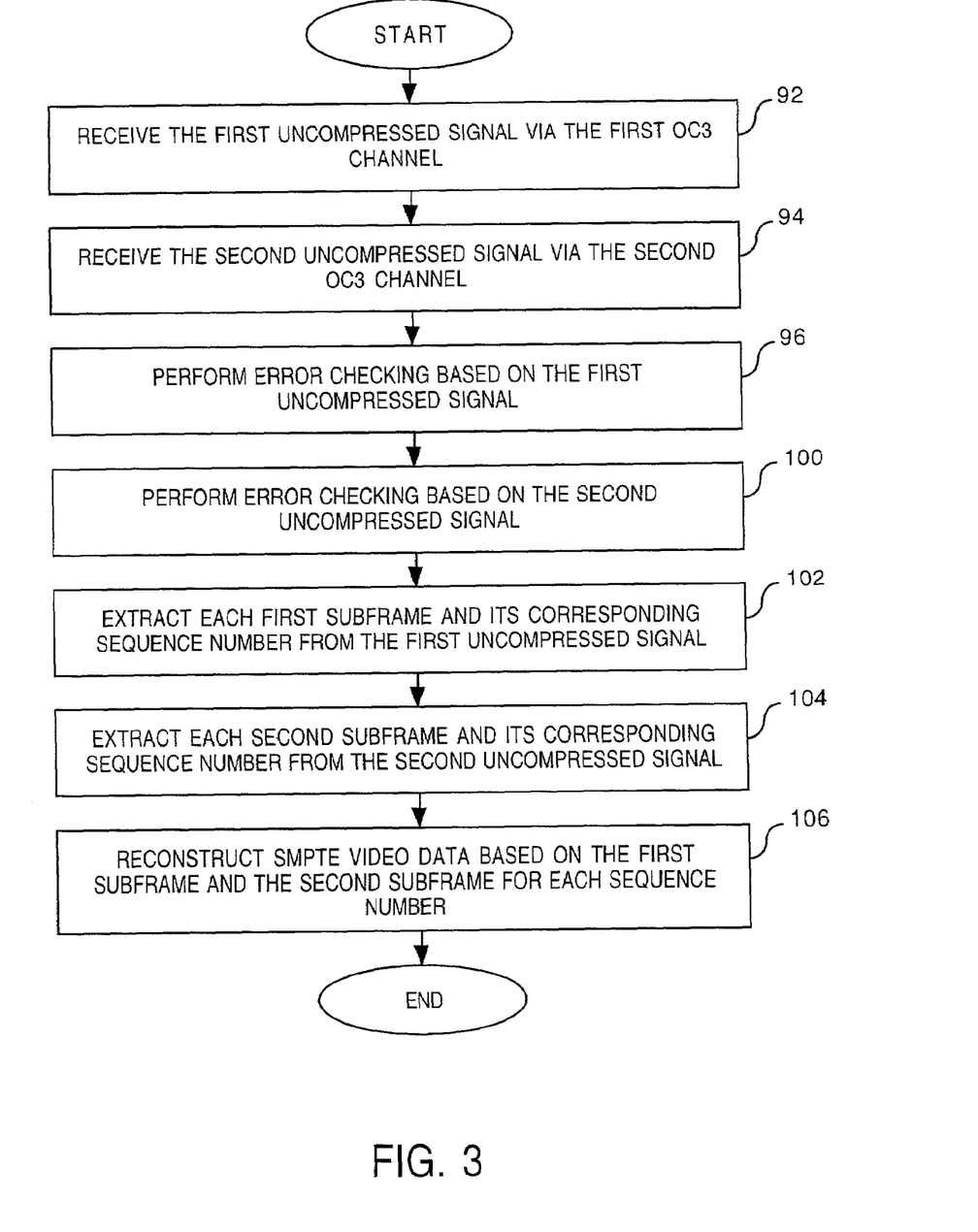
FIG. 3 is a flow chart of an embodiment of a method performed at a receiver end.

Turning now to FIG. 3, a method performed at the receiver end 22 comprises receiving the first uncompressed signal via the first OC-3 channel (block 92), and receiving the second uncompressed signal via the second OC-3 channel (block 94). As described above, the first uncompressed signal comprises a bit stream of a first plurality of ATM cells, and the second uncompressed signal comprises a bit stream of a second plurality of ATM cells. The ATM cells are extracted from the incoming bit streams.

As indicated by blocks 96 and 100, the method optionally comprises performing error checking based on the first uncompressed signal, and performing error checking based on the second uncompressed signal. An inverse FEC block code algorithm is used for error checking and recovery. If an error is detected, the block code may provide correction depending on which block code is used and the type and number of errors.

As indicated by block 102, the method comprises extracting each first subframe and its corresponding first sequence number from the first plurality of ATM cells. As indicated by block 104, the method comprises extracting each second subframe and its corresponding second sequence number from the second plurality of ATM cells. In these acts, the data payload is extracted from the AAL-1 or AAL-5 encapsulation.

As indicated by block 106, the method comprises reconstructing SMPTE video data 108, such as SMPTE 259M video data. Each frame of the SMPTE video data is reconstructed based on a first corresponding subframe represented within the first uncompressed signal and a second corresponding subframe represented within the second uncompressed signal. Further, the EAV and SAV timing signals are added to reconstructed frames. The reconstructed frames are ordered based on each first sequence number and each second sequence number.

One approach to ordering the frames comprises using a buffer management process to synchronize the arriving data based on the sequence numbers. A modified leaky bucket (LB) algorithm or similar technique can be used to synchronize the two fields. Optimization can be performed by varying the limit parameter based on the LB counter and the last compliance time. The arrival time is based on the arrival of the sequence number. This allows for a fast implementation in silicon, using the sequence number to direct data to the appropriate buffers.

It is noted that some acts described with reference to FIGS. 2 and 3 need not be performed in the order shown in FIGS. 2 and 3. Further, some of the acts may be performed concurrently. For example, the act of transporting the first signal via the first OC-3 channel typically is performed concurrently with the act of transporting the second signal via the second OC-3.

Referring back to FIG. 1, the transmitter end 20 comprises a video processor 110 which performs the method described with reference to FIG. 2. FIG. 6 is a schematic block diagram of an embodiment of the video processor 110 at the transmitter end 20. Each video frame 120 within SMPTE 259M video data 122 is separated into two active video subframes. A temporary buffer 124 stores one of the two active video subframes. A temporary buffer 126 stores the other of the two active video subframes. The temporary buffers 124 and 126 may have equal sizes. Ancillary data 130 within the SMPTE 259M video data 122 is appended to outputs of the temporary buffers 124 and 126. The resulting streams are applied to first-in-first-out (FIFOs) 132 and 134. A sequence number is added to the FIFO stream 132 by tagging logic 136. A sequence number is added to the FIFO stream 134 by tagging logic 140. An AAL 142 applies FEC to the output of the tagging logic 136. An AAL 144 applies FEC to the output of the tagging logic 140. A physical layer 146 couples the AAL 142 to the OC-3 channel 82 in FIG. 1. A physical layer 150 couples the AAL 144 to the OC-3 channel 86 in FIG. 1. The aforementioned components of the video processor 110 are directed by system control logic 152.

Figure 7:
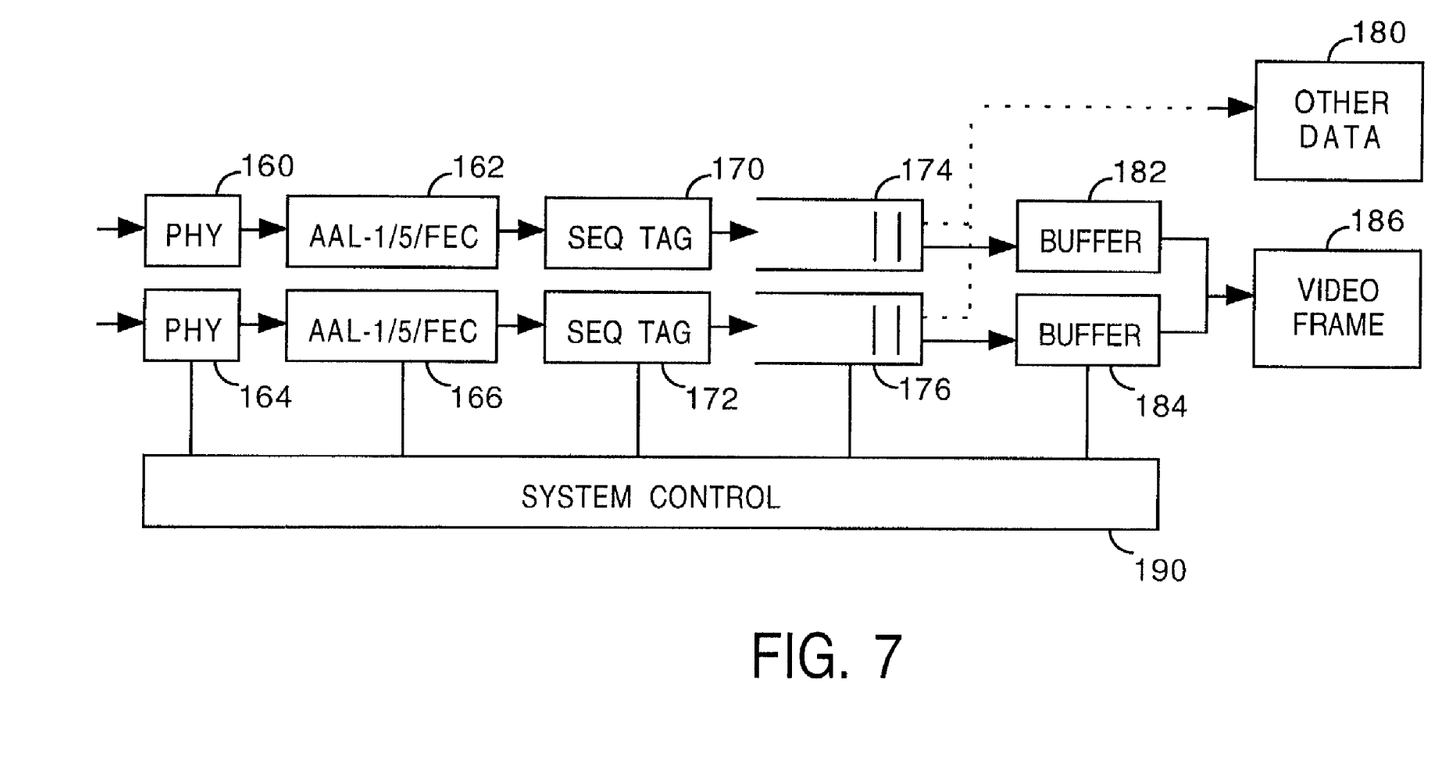
FIG. 7 is a schematic block diagram of an embodiment of a video processor at the receiver end.

Referring back to FIG. 1, the receiver end 22 comprises a video processor 158 which performs the method described with reference to FIG. 3. FIG. 7 is a schematic block diagram of an embodiment of the video processor 158 at the receiver end 22. A physical layer 160 couples the OC-3 channel 82 in FIG. 1 to an AAL 162. A physical layer 164 couples the OC-3 channel 86 in FIG. 1 to an AAL 166. The physical layers 160 and 164 extract ATM cells from an incoming bit stream. The AALs 162 and 166 perform an inverse FEC block code algorithm for error checking and/or correcting, and extract the data payload from AAL-1/5 encapsulation.

Tagging logic 170 is responsive to the AAL 162 to order each subframe based on its sequence number, and to remove the sequence number. Tagging logic 172 is responsive to the AAL 166 to order each subframe based on its sequence number, and to remove the sequence number. The resulting synchronized buffers are indicated by FIFOs 174 and 176. Ancillary data 180 is extracted from each subframe. Temporary buffers 182 and 184 store the two active video portions which, when combined with EAV and SAV signals, form a video frame 186. The video frame 186 is in accordance with an SMPTE standard such as SMPTE 259M. The aforementioned components of the video processor 158 are directed by system control logic 190. The system control logic 190, among other things, directs synchronization of data from the two separate fields.

Figure 8:
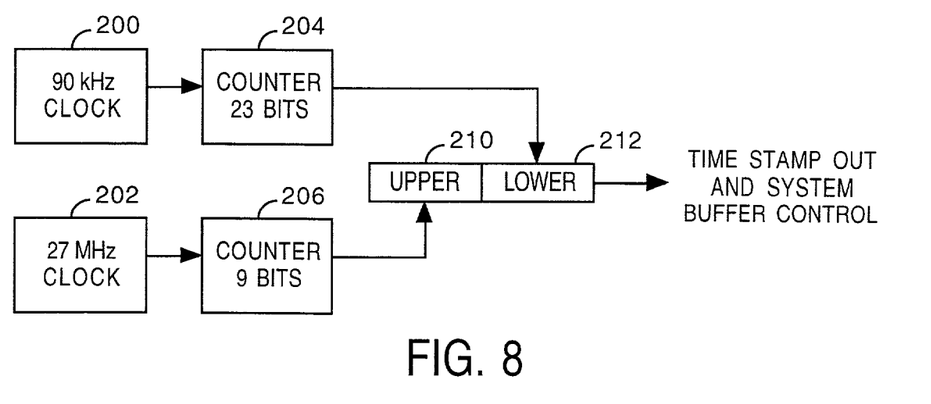
FIG. 8 is a block diagram of an embodiment of a system to provide timing information.

FIG. 8 is a block diagram of an embodiment of a system to provide timing information in addition to the sequence number. The timing information is based upon a first clock 200 and a second clock 202. Preferably, the first clock 200 has a frequency of 90 kHz, and the second clock 202 has a frequency of 27 MHz.

A first counter 204 is responsive to the first clock 200. A second counter 206 is responsive to the second clock 202. Preferably, the first counter 204 is a 23-bit counter and the second counter 206 is a 9-bit counter. The timing information has an upper portion 210 comprising bits from the second counter 206, and a lower portion 212 comprising bits from the first counter 204. The timing information is encapsulated as described above for the bit stream. The additional 32 bits keep the overall bandwidth within the bandwidth limit of the two OC-3 links.

Figure 9:
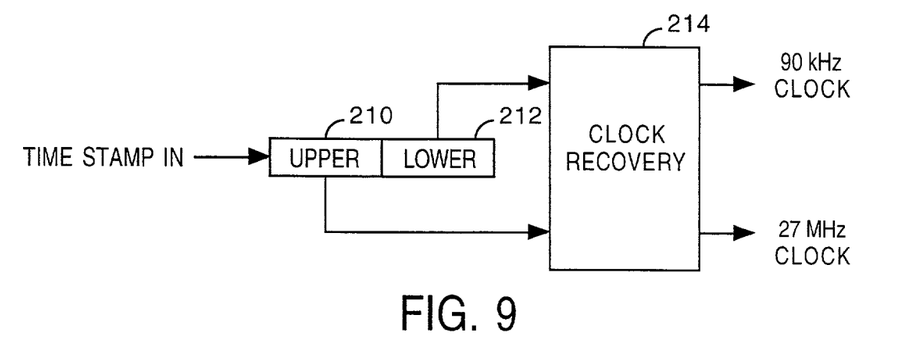
FIG. 9 is a block diagram of an embodiment of a system to reconstruct the timing information at the receiver end.

FIG. 9 is a block diagram of an embodiment of a system to reconstruct the timing information at the receiver end. A clock recovery module 214 outputs a first clock signal based on the lower portion 212 of the received timing information, and a second clock signal based on the upper portion 210. The clock recovery module 214 may be embodied using a phase-locked loop circuit. Preferably, the first clock signal has a frequency of 90 kHz and the second clock signal has a frequency of 27 MHz.

The clock signals can be useful in reducing jitter and synchronizing data. The use of field/frame counters allow better decisions to be made when reconstructing frames at the receiver. If link errors occur, the receiver can perform a first check on field number and decide what to do based thereupon. For example, the receiver may decide to use a previous frame and wait for the next consecutive frames to resynchronize.

Figure 10:
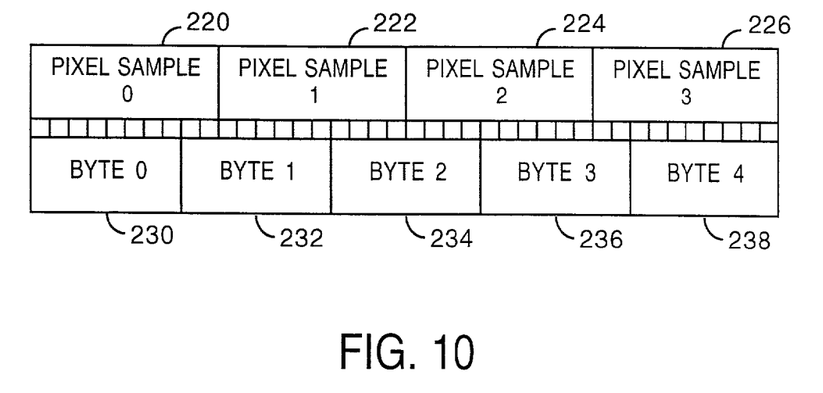
FIG. 10 is a block diagram depicting a packing method for transmitting 10-bit word information using 8-bit bytes.

FIG. 10 is a block diagram depicting a packing method for transmitting 10-bit word information using 8-bit bytes. Four consecutive pixel samples 220, 222, 224 and 226 are packed into five consecutive bytes 230, 232, 234, 236 and 238.

Several embodiments including preferred embodiments of a method and system to transport high-quality video signals have been described herein.

The herein-described methods and systems facilitate high bandwidth, real-time video signals to be transmitted over existing ATM infrastructure. Use of two OC-3 links rather than one OC-12 connection translates into a significant savings in bandwidth.

It will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

What is claimed is:

1. A method comprising:
   separating Society of Motion Picture and Television Engineers (SMPTE) video data into first data and second data;
   forming a first signal based on the first data;
   forming a second signal based on the second data;
   transporting the first signal via a first Optical Carrier 3 (OC-3) channel; and transporting the second signal via a second OC-3 channel;
   wherein said separating the SMPTE video data comprises separating each frame of the SMPTE video data into a first subframe and a second subframe;
   wherein said forming the first signal is based on the each first subframe;
   wherein said forming the second signal is based on each second subframe; and
   wherein the first subframe comprises even lines of active video from the frame, and the second subframe comprises odd lines of active video from the frame.

2. The method of claim 1 wherein the SMPTE video data are SMPTE 259M video data.

3. The method of claim 1 wherein said forming the first signal comprises appending a corresponding first sequence number to each first subframe, and wherein said forming the second signal comprises appending a corresponding second sequence number to each second subframe.

4. The method of claim 3 wherein said forming the first signal comprises encapsulating each first subframe with its corresponding first sequence number into at least one asynchronous transfer mode (ATM) cell, and said forming the second signal comprises encapsulating each second subframe with its corresponding second sequence number into at least one ATM cell.

5. The method of claim 4 wherein said forming the first signal further comprises providing a first adaptation layer with a first error checking code, and wherein said forming the second signal further comprises providing a second adaptation layer with a second error checking code.

6. The method of claim 5 wherein the first error checking code comprises a first error correcting code, and wherein the second error checking code comprises a second error correcting code.

7. The method of claim 1 wherein the first subframe comprises active video data and ancillary data, and wherein the second subframe comprises active video data and ancillary data.

8. The method of claim 1 wherein the first data and the second data are uncompressed.

9. A method comprising:
receiving a first signal via a first Optical Carrier 3 (OC-3) channel;
receiving a second signal via a second OC-3 channel; and
reconstructing Society of Motion Picture and Television Engineers (SMPTE) video data based on the first signal and the second signal;
wherein reconstructing the SMPTE video data comprises:
reconstructing each frame of the SMPTE video data based on a first corresponding subframe represented within the first signal and a second corresponding subframe represented within the second signal.

10. The method of claim 9 wherein the SMPTE video data are SMPTE 259M video data.

11. The method of claim 9 wherein the first signal comprises a corresponding first sequence number appended to each first subframe, wherein the second signal comprises a corresponding second sequence number appended to each second subframe, and wherein said reconstructing the SMPTE video data comprises ordering a plurality of reconstructed frames based on each first sequence number and each second sequence number.

12. The method of claim 11 wherein the first signal comprises a first plurality of asynchronous transfer mode (ATM) cells, wherein the second signal comprises a second plurality of ATM cells, the method further comprising:
extracting each first subframe and its corresponding first sequence number from the first plurality of ATM cells; and
extracting each second subframe and its corresponding second sequence number from the second plurality of ATM cells.

13. The method of claim 12 further comprising:
performing error checking based on the first signal; and
performing error checking based on the second signal.

14. The method of claim 13 further comprising: performing error correction based on the first signal.

15. The method of claim 9 wherein the first subframe comprises active video data and ancillary data, and wherein the second subframe comprises active video data and ancillary data.

16. The method of claim 9 wherein the first subframe comprises even lines of active video from the frame, and the second subframe comprises odd lines of active video from the frame.

17. A system comprising:
a video processor to separate Society of Motion Picture and Television Engineers (SMPTE) video data into first data and second data, the video processor comprising a first ATM adaptation layer (AAL) coupled to a first physical layer to form a first signal based on the first data and to couple the first signal to a first Optical Carrier 3 (OC-3) channel, and a second AAL coupled to a second physical layer to form a second signal based on the second data and to couple the second signal to a second OC-3 channel.

18. The system of claim 17 wherein the SMPTE video data are SMPTE 259M video data.

19. The system of claim 17 wherein the video processor is to separate each frame of the SMPTE video data into a first subframe and a second subframe, wherein the first signal is based on the each first subframe, and wherein the second signal is based on each second subframe.

20. The system of claim 19 wherein the video processor further comprises first tagging logic to append a corresponding first sequence number to each first subframe, and second tagging logic to append a corresponding second sequence number to each second subframe, wherein the first AAL is responsive to the first tagging logic, and wherein the second AAL is responsive to the second tagging logic.

21. The system of claim 20 wherein the first AAL is to encapsulate each first subframe with its corresponding first sequence number into at least one asynchronous transfer mode (ATM) cell, and wherein the second AAL is to encapsulate each second subframe with its corresponding second sequence number into at least one ATM cell.

22. The system of claim 21 wherein the first AAL is to provide a first error checking code, and wherein the second AAL is to provide a second error checking code.

23. The system of claim 22 wherein the first error checking code comprises a first error correcting code, and wherein the second error checking code comprises a second error correcting code.

24. The system of claim 19 wherein the first subframe comprises active video data and ancillary data, and wherein the second subframe comprises active video data and ancillary data.

25. The system of claim 19 wherein the first subframe comprises even lines of active video from the frame, and the second subframe comprises odd lines of active video from the frame.

26. The system of claim 17 wherein the first data and the second data are uncompressed.

27. A system comprising:
a video processor comprising a first physical layer coupled to a first asynchronous transfer mode adaptation layer (AAL) to receive a first signal via a first Optical Carrier 3 (OC-3) channel, the video processor further comprising a second physical layer coupled to a second ML to receive a second signal via a second OC-3 channel, the video processor to reconstruct Society of Motion Picture and Television Engineers (SMPTE) video data based on the first signal and the second signal.

28. The system of claim 27 wherein the SMPTE video data are SMPTE 259M video data.

29. The system of claim 27 wherein the video processor is to reconstruct each frame of the SMPTE video data based on a first corresponding subframe represented within the first signal and a second corresponding subframe represented within the second signal.

30. The system of claim 29 wherein the first signal comprises a corresponding first sequence number appended to each first subframe, wherein the second signal comprises a corresponding second sequence number appended to each second subframe, and wherein the video processor is to order a plurality of reconstructed frames based on each first sequence number and each second sequence number.

31. The system of claim 30 wherein the first signal comprises a first plurality of asynchronous transfer mode (ATM) cells, wherein the second signal comprises a second plurality of ATM cells, wherein the first AAL is to extract each first subframe and its corresponding first sequence number from the first plurality of ATM cells, and wherein the second AAL is to extract each second subframe and its corresponding second sequence number from the second plurality of ATM cells.

32. The system of claim 31 wherein the first AAL is to perform error checking based on the first signal, and wherein the second AAL is to perform error checking based on the second signal.

33. The system of claim 32 wherein the first AAL is to perform error correction based on the first signal.

34. The system of claim 29 wherein the first subframe comprises active video data and ancillary data, and wherein the second subframe comprises active video data and ancillary data.

35. The system of claim 29 wherein the first subframe comprises even lines of active video from the frame, and the second subframe comprises odd lines of active video from the frame.

* * * * *